United States Patent [19]

Ozone et al.

[11] Patent Number: 4,726,558
[45] Date of Patent: Feb. 23, 1988

[54] GROMMET AND GROMMET RETAINING MEMBER

[75] Inventors: Teruyoshi Ozone, Nagoya; Katsuya Nagano, Okazaki, both of Japan

[73] Assignee: Nihon Sekiso Kogyo Kabushiki Kaisha, Nagoya, Japan

[21] Appl. No.: 825,982

[22] Filed: Feb. 4, 1986

Related U.S. Application Data

[63] Continuation of Ser. No. 665,553, Oct. 29, 1984, abandoned.

[51] Int. Cl.⁴ .................................................. F16L 3/22
[52] U.S. Cl. ..................................... 248/68.1; 248/742; 403/267
[58] Field of Search .................... 248/74.2, 74.1, 68.1, 248/59, 58, 62; 24/693, 90 HA; 403/30, 29, 267, 28, 406, 266

[56] References Cited

U.S. PATENT DOCUMENTS

| | | | |
|---|---|---|---|
| 2,510,693 | 6/1950 | Green | 411/512 X |
| 3,367,809 | 2/1968 | Soloff | 411/908 X |
| 3,995,795 | 12/1976 | Hogan | 248/68.1 |

FOREIGN PATENT DOCUMENTS 1290461  12/1960  France ............................. 248/68 R Primary Examiner—J. Franklin Foss
Assistant Examiner—David L. Talbott
Attorney, Agent, or Firm—Paul L. Sjoquist

[57] ABSTRACT

Disclosed herein is a method of making a grommet composed of a body member having a shank and fitting recesses for receiving a linear article therein; and a retaining member for supporting the body member through the shank and securing the same to a vehicle at its predetermined location. The invention method comprises the steps of forming either the retaining member or the body member by injection molding a first synthetic resin; and forming the other member on the first molded member by injection molding a second synthetic resin which is different in kind from and nonconjunctive to the first synthetic resin so as to obtain an assembly of the retaining member and the body member.

5 Claims, 6 Drawing Figures

GROMMET AND GROMMET RETAINING MEMBER

This application is a continuation of application Ser. No. 665,553, filed Oct. 29, 1984 now abandoned.

BACKGROUND OF THE INVENTION

1. Field of the Invention

The present invention relates to a method of making a grommet or wire clamp which is used, for example in a vehicle, for retaining a linear article such as brake piping and wire harness on a predetermined location of the vehicle body.

2. Description of the Prior Art

The prior art grommet of this kind is generally composed of a body member formed from synthetic resin adapted for holding a linear article; and a retaining member formed of metal, and these members are assembled in such a manner as to allow freedom of movement of the body member relative to the retaining member. However, such a grommet had to be assembled from a plastic member and a metal member formed separately, leading to troublesome production.

There has been proposed another type of grommet having the body member and the retaining member integrally formed of a single synthetic resin, in which the body member cannot move relative to the retaining member. In this case, the grommet has a difficulty in mounting the article because the body member lacks freedom of movement relative to the retaining member.

Further, in resin molding of keys in different colors, such as keys of a keyboard which have a white and black resin section overlaid and bonded to each other, the prior art has proposed to alternately inject two resins of the same kind having different colorants so as to obtain moldings having two layers, black and white. However, such a prior method of injection molding is mainly directed toward an art to securely bond the black and white sections so that they may not separate from each other.

SUMMARY OF THE INVENTION

It is, accordingly, an object of the present invention to provide a method of making a grommet by injection molding synthetic resins in which an assembly of a body member and a retaining member may be formed in such a manner as to allow freedom of movement of the former relative to the latter, thereby obtaining a grommet which permits ease of mounting of the article thereon and simplifying the assembly step in the production of grommets.

It is another object of the present invention to provide a method of making by injection molding two kinds of synthetic resins a grommet which is an assembly of a body member having fitting recesses for receiving a linear article therein and a retaining member in which the body member is loosely fitted through the shank thereof.

It is a further object of the present invention to provide a method of making a plastic grommet which can be readily carried out by an injection molding machine of the type using two kinds of synthetic resins which are nonconjunctive to each other.

According to the present invention, there is provided a method of making a grommet which is composed of a body member having fitting recesses for receiving a linear article therein and a retaining member for supporting and securing the body member to a vehicle at its predetermined location. The method comprises the steps of forming either the retaining member or the body member by injection molding a synthetic resin; and forming the other member on the first molded member by injection molding another synthetic resin which is different in kind from and nonconjunctive to the first-mentioned synthetic resin so as to obtain an assembly of the retaining member and the body member. Specifically, the retaining member and the body member are formed by injection molding the respective synthetic resins which are nonconjunctive to each other in such a manner that the body member may be fitted to the retaining member through a shank of the body member. Thus, the invention method provides a grommet in the form of an assembly of the retaining member and the body member connected by means of the shank; and can eliminate such assembling step as is required in the conventional method in which retaining members and body members are formed separately and subsequently assembled into grommets. Additionally, as the body member of the grommet, which is made of a synthetic resin different from and nonconjunctive to the one for the retaining member, is fitted to the retaining member through the stem thereof maintaining suitable degrees of freedom with respect to the retaining member, the body member can suitably move relative to the retaining member, thereby assisting in mounting articles thereon. Further, the method of the present invention can be readily carried out by an injection molding machine using heterogeneous synthetic resins.

The present invention will become more fully apparent from the claims and description as it proceeds in connection with the drawings.

DETAILED DESCRIPTION OF THE INVENTION

Figure 1:
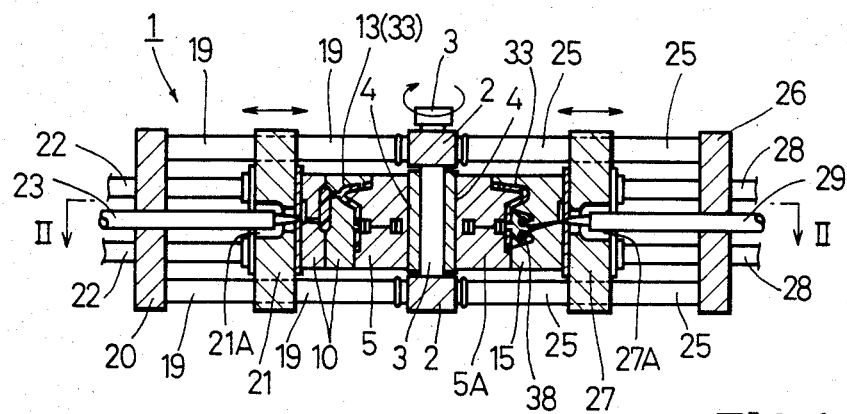
FIG. 1 is a sectional view of an apparatus used for performing the method of the present invention.
Figure 2:
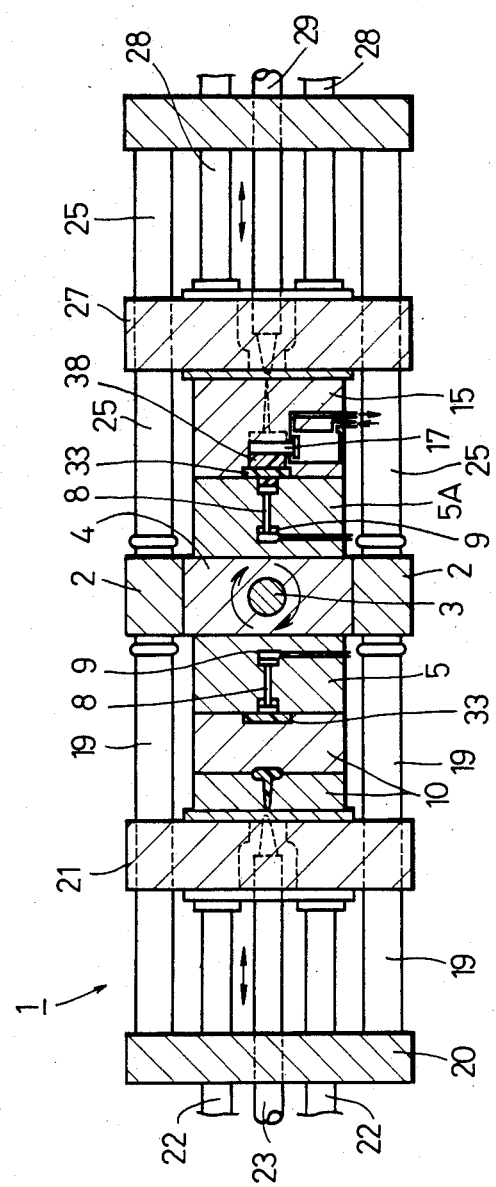
FIG. 2 is an enlarged sectional view taken along line II—II of FIG. 1.

Referring now to FIGS. 1 and 2, there is shown an inversion platen type injection molding machine, which is a type of injection molding machine known in the industry, as for example Model KS-2C-70, manufactured by Takahashi Seiki Kogyo Co., the mold portion thereof being modified to carry out the invention method. Support members 2 are provided to support a support shaft 3, and an inversion platen 4 is mounted on the support shaft 3. A first convex mold half 5 for first molding and a second convex mold half 5A for second molding are firmly secured to the inversion platen 4, being arranged symmetrically at an angle of 180°. Numeral 10 indicates a first concave mold half which defines, in cooperation with the first convex mold half 5, a first mold cavity 13 for molding a retaining member 33 of the grommet. Guide members 19 are connected to the support members 2, respectively, and a fixed platen 20 is connected to the guide members 19 opposite the support members 2. The first concave mold half 10 is secured to a movable platen 21 which travels along the guide members 19. The movable platen 21 is actuated by a hydraulic cylinder 22 interposed between the fixed platen 20 and the movable platen 21. It is important to note that after the concave mold half 10 is retracted from the molded member or product formed in the first mold cavity 13, the molded member, being carried on the first convex mold half 5, is inverted 180 degrees to serve as the second convex mold half 5A.

Figure 4:
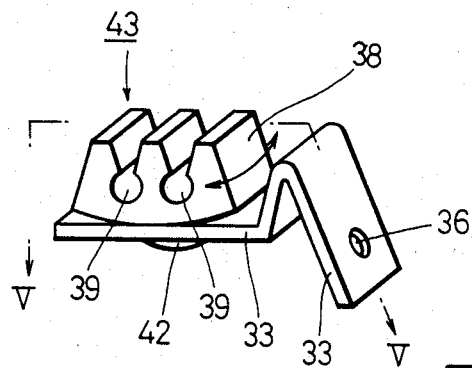
FIG. 4 is a perspective view of a grommet formed according to the present invention.
Figure 5:
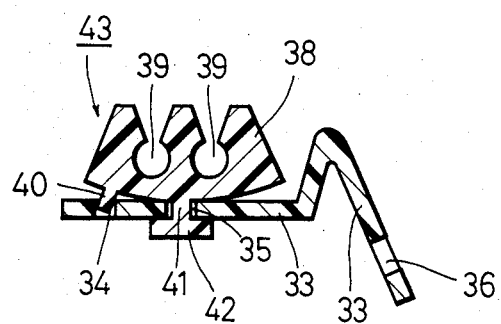
FIG. 5 is a vertical sectional view taken along line V—V of FIG. 4.

The second concave mold half 15 defines, in cooperation with the second convex mold half 5A, a second mold cavity 18 for forming a grommet body member 38 (FIGS. 4 and 5). The second concave mold half 15 is provided with a pair of slide members 17 adapted to form fitting recesses 39 in the body member 38 for holding articles H. The slide members 17 are normally received in the second concave mold half 15, and when the second mold cavity 18 is defined by the second concave mold half 15 and the second convex mold half 5A, the slide members 17 are slid by means of a hydraulic device (not shown) until they project transversely into the second mold cavity 18.

The second concave mold half 15 is firmly secured to a movable platen 27 which travels along guide members 25 connected to the support members 2, respectively. A fixed platen 26 is connected to the guide members 25 opposite the support members 2. The movable platen 27 is actuated by a hydraulic cylinder 28 interposed between the fixed platen 26 and the movable platen 27. Numeral 23 indicates a first injection nozzle for injecting synthetic resin into the first mold cavity 13. The nozzle 23 is adapted to communicate with a sprue hole 12 formed in the assembled first concave mold half 10 through a through hole 21A formed in the first movable platen 21. Numeral 29 indicates a second injection nozzle for injecting synthetic resin into the second mold cavity 18. The nozzle 29 is adapted to communicate with a sprue hole 16 formed in the assembled second concave mold half 15 through a through hole 27A formed in the second movable platen 27. It will be noted that the first injection nozzle 23 travels along with the first concave mold half 10, and that the second injection nozzle 29 travels along with the second concave mold half 15.

Figure 3:
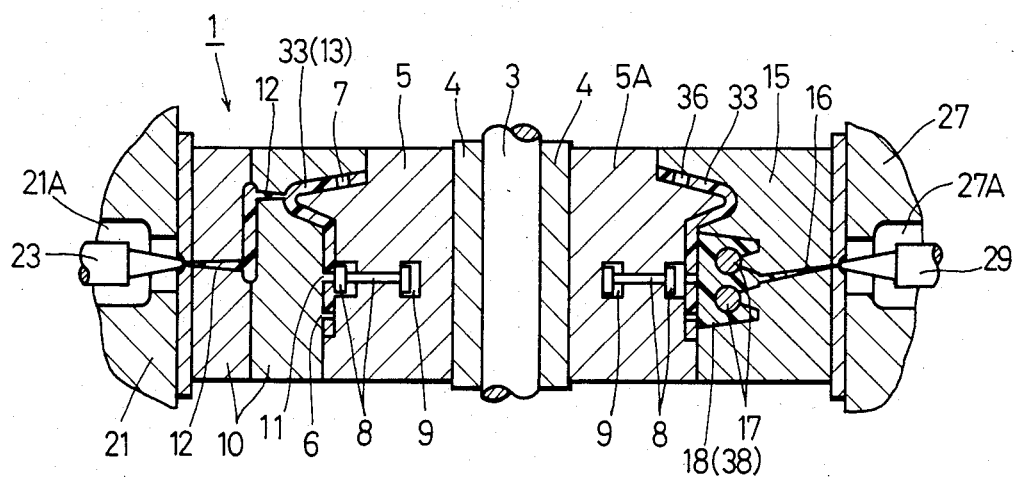
FIG. 3 is an enlarged sectional view of the essential parts of FIG. 1.

As may be seen best in FIG. 3, a hydraulic core 8 is provided on the molding surface of the first convex mold half 5, extending into an oil chamber 9 located within the mold half 5. The core 8 is not actuated during injection of the first synthetic resin in the first molding, while, during injection of the second synthetic resin in the second molding, oil is expelled from the oil chamber 9, and the core 8 is retracted within the oil chamber 9 to form a shank 41 of the body member 38 a disk 42 which serves to prevent the body member 38 from coming out of the molded retaining member 33 (FIGS. 4 and 5). Also, the first concave mold half 5 is provided on the molding surface thereof with mold protrusions 6, 7 and 11 which are adapted to form in the retaining member 33 a hole 35 for mounting the shank 41, a screw hole 36 and a small hole 34 for preventing rotation of the body member 38, respectively.

Now, an embodiment of the present invention will be described along with the operation of the apparatus discussed above. The first injection nozzle 23 is set to the first mold cavity 13 defined by the first convex mold half 5 and the first concave mold half 10, and the first synthetic resin is injected into the first mold cavity 13 through the first injection nozzle 23. In this embodiment, nylon ("MARANYL-A190" made by Unichika Co.,) containing glass fiber (10 to 13 in diameter and 5 to 7 mm in length) in the amount of 33 percent of nylon 66 resin is injected at a resin temperature of 225° C. under an injection pressure of 150 kg/cm$^2$. Thus, the retaining member 33 of the grommet is molded from the first synthetic resin in the first mold cavity 13. After the injection of the first synthetic resin, the first injection nozzle 23 and the first concave mold half 10 are retracted, and the first convex mold half 5 carrying the retaining member 33, which serves as the second convex mold half 5A is inverted 180 degrees around the supporting shaft 3 of the inversion platen 4. Then, the second concave mold half 15 is mated with the second convex mold half 5A to define the second mold cavity 18 for forming the body member 38. After the second injection nozzle 29 is set in position, the synthetic resin is injected into the second molding cavity 18. In this embodiment, polypropylene (isotactic polypropylene "MITSUINORBLENE BJS" made by Mitsui Toatsu Kagaku Co.,) is injected at a resin temperature of 200° C. under an injection pressure of 100 kg/cm$^2$. The first and the second synthetic resins to be employed may be of the type which is injection-moldable and nonconjunctive, free from mutual adhesion after their injection molding, such as nylon and polypropylene used in this embodiment. These resins are as follows; polyphenylene-oxide, acrylonitrile-butadiene-styrene-copolymer, stylene-acrylonitrile copolymer, ethylene-vinyl acetate copolymer, methylmethacrylate, polycarbonate, polyethylene, polypropylene and polyvinylchloride. Among these resins are previously selected a pair of resins that will not adhere to each other after their injection molding.

In the second mold cavity 18, the second synthetic resin is formed into the body member 38. Then, the second injection nozzle 29 and the second concave mold half 15 are retracted. Now is obtained a grommet 43 with the body member 38 fitted to the retaining member 33 through the shank 41. As the grommet 43 has the retaining member 33 made of nylon resin and the body member 38 made of polypropylene which shrinks and cures after being injection molded, the body member 38 is retained on the retaining member 33, with the shank 41 loosely extending through the shank-mounting hole 35 of the retaining member 33 and a projection 40 loosely fitted in the small hole 34 of the retaining member 33 (FIG. 5). This construction allows the body member 38 to have proper freedom of movement relative to the retaining member 33.

Figure 6:
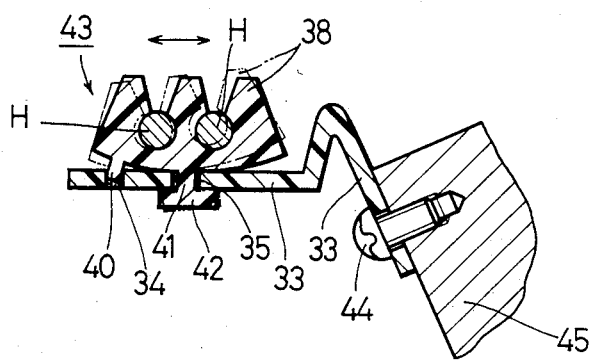
FIG. 6 is a view illustrating the grommet in use.

The grommet 43 of this embodiment is secured by a screw 44 through the screw hole 36 of the retaining member 33 to a vehicle at its predetermined location 45 of a sheet metal of the engine compartment or the backside of the body floor panel, and then articles H are received in the fitting recesses 39 of the body member 38. Alternatively, after the articles H are received in the fitting recesses 39 of the body member 38, the grommet may be secured by the screw 44 through the screw hole 36 of the retaining member 33. The proper freedom of movement of the body member 38 relative to the retaining member 33 permits ease of mounting of the articles H, as shown in FIG. 6.

Though, in this embodiment, the retaining member 33 is first injection-molded and then the body member 38 is injection-molded, the injection molding sequence may be reversed. Further, the body member 38 is provided with two fitting recesses 39 in this embodiment, the number of the fitting recesses may be varied.

While the invention has been described with reference to a preferred embodiment thereof, it is to be understood that modifications or variations may be easily made without departing from the scope of the present invention which is defined by the appended claims.

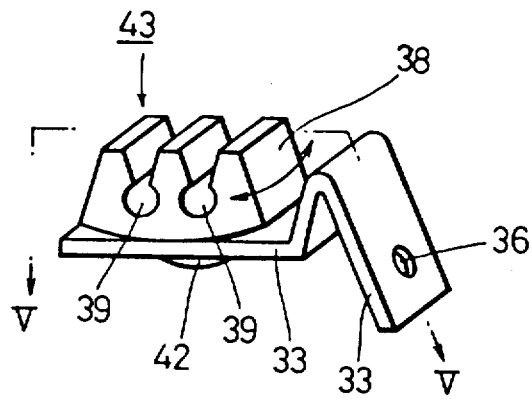

What is claimed is:

1. A grommet and grommet retaining member apparatus formed in a single molding operation using heterogeneous synthetic resins, comprising
   (a) a grommet retaining member molded from a first synthetic resin having a predetermined shrinkage characteristic upon curing, said member having a grommet receiving arm with a hole therethrough and means for attachment to a surface; and
   (b) a grommet member molded as a single homogeneous part from a second synthetic resin having a predetermined shrinkage characteristic upon curing which provides lesser shrinkage than said first synthetic resin, said grommet member having a shank portion extending through said receiving arm hole, said shank portion loosely fitted through said hole, an enlarged disk adjacent one side of said receiving arm and overlapping said receiving arm hole, and a body portion adjacent the other side of said receiving arm with a fitting recess means for receiving and clamping an article, and a clearance dimension between said enlarged disk and said body portion which is greater than the distance between said one side and said other side of said receiving arm, said clearance dimension and said loosely-fitted shank portion being created by relatively greater shrinkage of said first synthetic resin as compared with said second synthetic resin.

2. The apparatus of claim 1, wherein said first synthetic resin is nylon and said second synthetic resin is polypropylene.

3. The apparatus of claim 1, wherein said grommet member body portion fitting recess means further comprises at least one cavity intermediate upstanding resilient shoulders.

4. The apparatus of claim 3, wherein said cavity further comprises an opening having a semicircular cross-section of greater than 180°.

5. The apparatus of claim 4, further comprising two cavities having a single intermediate shoulder therebetween, each of said cavities having a semicircular cross-section of greater than 180°.

* * * * *

UNITED STATES PATENT AND TRADEMARK OFFICE
CERTIFICATE OF CORRECTION

PATENT NO. : 4,726,558

DATED : February 23, 1988

INVENTOR(S) : Teruyoshi Ozone, et al

Page 1 of 2

It is certified that error appears in the above-identified patent and that said Letters Patent is hereby corrected as shown below:

The title page should be deleted to appear as per attached title page.

Signed and Sealed this

Nineteenth Day of July, 1988

Attest:

DONALD J. QUIGG

*Attesting Officer*   *Commissioner of Patents and Trademarks*

United States Patent [19]

Ozone et al.

[11] Patent Number: 4,726,558
[45] Date of Patent: Feb. 23, 1988

[54] GROMMET AND GROMMET RETAINING MEMBER

[75] Inventors: Teruyoshi Ozone, Nagoya; Katsuya Nagano, Okazaki, both of Japan

[73] Assignee: Nihon Sekiso Kogyo Kabushiki Kaisha, Nagoya, Japan

[21] Appl. No.: 825,982

[22] Filed: Feb. 4, 1986

Related U.S. Application Data

[63] Continuation of Ser. No. 665,553, Oct. 29, 1984, abandoned.

[51] Int. Cl.⁴ .................................................. F16L 3/22
[52] U.S. Cl. .................................. 248/68.1; 248/742; 403/267
[58] Field of Search ............... 248/74.2, 74.1, 68.1, 248/59, 58, 62; 24/693, 90 HA; 403/30, 29, 267, 28, 406, 266

[56] References Cited

U.S. PATENT DOCUMENTS

| | | | |
|---|---|---|---|
| 2,510,693 | 6/1950 | Green | 411/512 X |
| 3,367,809 | 2/1968 | Soloff | 411/908 X |
| 3,995,795 | 12/1976 | Hogan | 248/68.1 |

FOREIGN PATENT DOCUMENTS

| | | | |
|---|---|---|---|
| 1290461 | 12/1960 | France | 248/68 R |

Primary Examiner—J. Franklin Foss
Assistant Examiner—David L. Talbott
Attorney, Agent, or Firm—Paul L. Sjoquist

[57] ABSTRACT

Disclosed herein is a method of making a grommet composed of a body member having a shank and fitting recesses for receiving a linear article therein; and a retaining member for supporting the body member through the shank and securing the same to a vehicle at its predetermined location. The invention method comprises the steps of forming either the retaining member or the body member by injection molding a first synthetic resin; and forming the other member on the first molded member by injection molding a second synthetic resin which is different in kind from and nonconjunctive to the first synthetic resin so as to obtain an assembly of the retaining member and the body member.

5 Claims, 6 Drawing Figures